US009115236B2

United States Patent
Adam et al.

(10) Patent No.: US 9,115,236 B2
(45) Date of Patent: Aug. 25, 2015

(54) COPOLYMER FOR INHIBITING INORGANIC DEPOSITS

(75) Inventors: Hervé Adam, Clarksburg, NJ (US); Dominique Labarre, Neuilly-sur-Seine (FR); James Wilson, Paris (FR); Jean-François Argillier, Rueil-Malmaison (FR); Brigitte Bazin, Paris (FR); Patrick Gateau, Maurepas (FR); Benjamin Herzhaft, Suresnes (FR)

(73) Assignees: IFP ENERGIES NOUVELLES, Rueil-Malmaison (FR); RHODIA OPERATIONS, Aubervilliers (FR)

(*) Notice: Subject to any disclaimer, the term of this patent is extended or adjusted under 35 U.S.C. 154(b) by 940 days.

(21) Appl. No.: 13/144,752

(22) PCT Filed: Dec. 23, 2009

(86) PCT No.: PCT/FR2009/001481
§ 371 (c)(1),
(2), (4) Date: Oct. 17, 2011

(87) PCT Pub. No.: WO2010/081944
PCT Pub. Date: Jul. 22, 2010

(65) Prior Publication Data
US 2012/0028856 A1    Feb. 2, 2012

Related U.S. Application Data

(60) Provisional application No. 61/145,254, filed on Jan. 16, 2009.

(51) Int. Cl.
*C09K 8/528* (2006.01)
*C09K 8/22* (2006.01)
(Continued)

(52) U.S. Cl.
CPC ............. *C08F 220/06* (2013.01); *C08F 220/38* (2013.01); *C08F 230/02* (2013.01); *C09K 8/528* (2013.01)

(58) Field of Classification Search
CPC ....... C09K 8/52; C09K 8/528; Y10S 507/927
USPC ........... 507/90, 128, 224, 227, 235, 253, 255, 507/927
See application file for complete search history.

(56) References Cited

U.S. PATENT DOCUMENTS

| 3,449,303 | A | * | 6/1969 | Hill et al. ..................... 526/240 |
| 4,209,398 | A |   | 6/1980 | Ii et al. |
| 4,898,677 | A | * | 2/1990 | Brase ............................ 210/701 |
| 6,063,289 | A |   | 5/2000 | Failon et al. |
| 6,123,869 | A |   | 9/2000 | Lawson et al. |

(Continued)

FOREIGN PATENT DOCUMENTS

| FR | 2 868 783 A1 | 10/2005 |
| FR | 2 917 747 A1 | 12/2008 |
| WO | WO 03/029153 A2 | 4/2003 |

*Primary Examiner* — Aiqun Li
(74) *Attorney, Agent, or Firm* — Fitch, Even, Tabin & Flannery LLP

(57) ABSTRACT

The invention relates to a copolymer having:
A) at least one monomer unit a) derived from at least one ethylenically unsaturated aliphatic monocarboxylic or polycarboxylic acid, a corresponding anhydride, or a corresponding water-soluble salt;
B) at least one monomer unit b) derived from a particular sulfonated or sulfated ethylenically unsaturated ether or at least one monomer unit (b') derived from a sulfonated ethylenically unsaturated monomer other than (b),
C) at least one monomer unit (c) derived from a monomer with the average general formula $[CH_2=CH-CH_2-R^6-O-]_xP(=O)(OM)_{3-x}$.

The invention also relates to a method for preparing such a copolymer, an inhibitor composition including such a copolymer, and a method for inhibiting inorganic deposits in a petroleum reservoir by means of said inhibitor composition.

23 Claims, 1 Drawing Sheet

(51) Int. Cl.
*C09K 8/588* (2006.01)
*C02F 5/10* (2006.01)
*C08F 220/06* (2006.01)
*C08F 220/38* (2006.01)
*C08F 230/02* (2006.01)

(56) References Cited

U.S. PATENT DOCUMENTS

2003/0052303 A1\* 3/2003 Buentello et al. ............. 252/175
2005/0282712 A1\* 12/2005 Crossman et al. ............ 507/227

\* cited by examiner

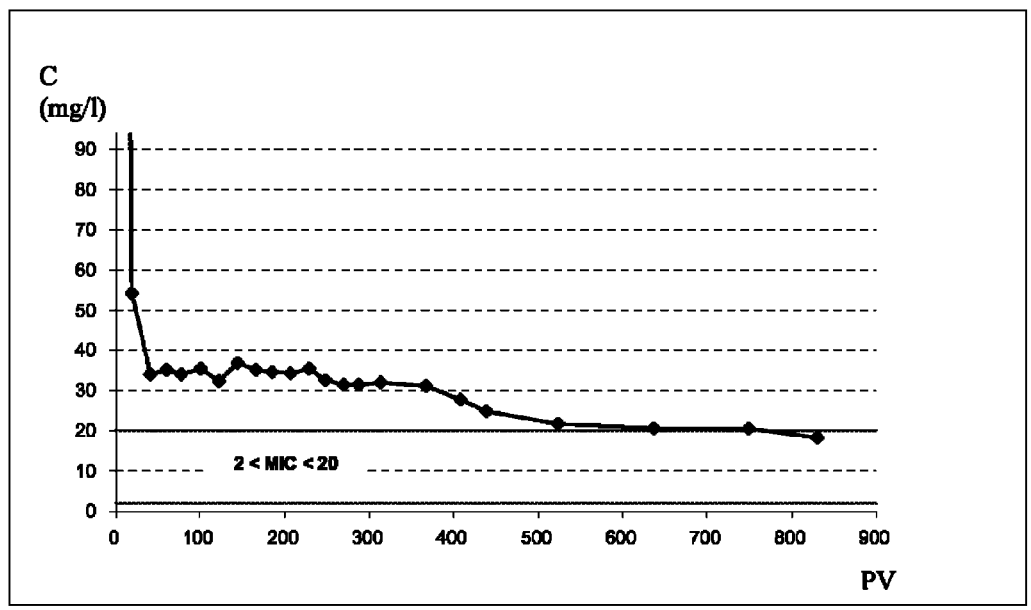

COPOLYMER FOR INHIBITING INORGANIC DEPOSITS

CROSS REFERENCE TO RELATED APPLICATIONS

This Application is the National-Stage Entry of PCT/FR2009/001481, filed Dec. 23, 2009. This Application claims priority to U.S. Provisional Application 61/145,254, filed Jan. 16, 2009.

BACKGROUND OF THE INVENTION

The invention relates to inhibition of inorganic deposits (scale for example) particularly in petroleum reservoirs, more particularly under HP/HT (high-pressure high-temperature) conditions.

HP/HT reservoirs are defined as those with generally high salinity, a temperature of at least 150° C., and pressures that may exceed 70 bars, for example offshore reservoirs.

Numerous operations in the petroleum industry may give rise to inorganic deposits, particularly producing operations, producing-well stimulation, and transportation. Most of the inorganic deposits in the petroleum sector are linked either to direct precipitation that occurs naturally in reservoir rock or to supersaturation of the producing water that occurs when two incompatible liquids are found downhole.

The deposits can consist of calcium carbonate, barium sulfate, calcium sulfate, strontium sulfate, iron carbonate, iron oxides, iron sulfates, and magnesium salt deposits. Silica deposits may also form, particularly with SAGD (steam assisted gravity drainage) techniques.

Specific problems are linked to HP/HT conditions. Deposits of varied compositions may occur in HP/HT wells, particularly mineral deposits such as barium sulfate, strontium sulfate, and calcium sulfate. The problem of carbonate deposits (particularly calcium) is highly specific due to the drastic reduction in the solubility of calcium carbonate when the temperature rises. The main effect is due to $CO_2$ degassing when the pressure drops during the producing process and to the high salinity (high calcium concentration) in the formation water present in HP/HT reservoirs.

Highly specific deposits may also be noted, particularly in cases where the wells produce gas from the reservoir. These are halite deposits due to very high salinity of the water associated with gas production and water evaporation near the well. These deposits are generally treated by flushing the well bottom with water from the aquifer, or low-salinity water, or even with desulfated water.

Moreover, the production lines in HP/HT reservoirs are subject to wide temperature variations, particularly when offshore. The downhole temperature may be high (150° C.) but at the sea bed the temperature may be about 4° C., meaning significant temperature gradients over distances as far as several thousand meters. In this case, the location of the inorganic deposits results from both thermodynamic and kinetic effects whose amplitudes are temperature-dependent. For example, for barium sulfate, the solubility increases with temperature, making deposition highly probable at low temperatures, but the precipitation rate decreases with temperature, limiting the extent of the precipitation.

Well flushing by injecting desulfated water (20-100 mg/L) does not solve every problem, however. When the sulfate concentration is low in the injected seawater, barium sulfate deposits may occur, but in smaller quantities. For these reasons, an inhibitor of inorganic deposit formation is generally added to the flushing water to prevent any risk of precipitates (generally sulfates) forming when the aquifer water is mixed with the highly saline brine.

Deposition inhibitors prevent precipitation by two main mechanisms:
  inhibition of nucleation: they act as dispersants to prevent formation of nuclei;
  growth inhibition: they prevent the growth of crystals by adsorption on crystal sites. They can act as dispersants to limit aggregation.

The scale inhibiting molecules may have sizes adapted to the crystallographic size of the designated salt. It is generally considered that phosphonates are crystal growth inhibitors, while polymers act as dispersants. Most commercial products are mixtures of growth and nucleation inhibitors. Scale inhibitors are effective at very low concentrations. There is a threshold effectiveness concentration called the Minimum Inhibitory Concentration (MIC).

Inhibitor Retention

The scale inhibitors are retained downhole by two main mechanisms: retention by adsorption and/or retention by precipitation. The retention mechanisms depend on the chemical nature of the substance, the concentration, and reservoir-dependent parameters such as the composition of the reservoir water, the mineralogy of the rock, pH, and temperature. The adsorption process involves electrostatic adsorption mechanisms or Van der Waals bonding mechanisms. The pH and divalent ion (calcium) concentration are the predominant factors that enhance adsorption. In certain cases, the divalent cations are also responsible for surface or mass precipitation, which increases retention.

PRIOR ART

Current methods for inhibiting formation of inorganic deposits employ compounds containing phosphorus, usually polymers, with molecular masses generally less than 10,000, of the carboxylic acid, sulfonic acid, or polyamide type.

The commonest application of these methods is treatment of industrial water.

For example, organic phosphonic acids are described in U.S. Pat. No. 6,063,289 and U.S. Pat. No. 6,123,869. Acrylic polymers containing a phosphinate or phosphonate group can also be used, for example a copolymer of methacrylic acid with phosphate functionality for treating industrial water (U.S. Pat. No. 4,209,398). However, the use of such inhibitors is unsatisfactory from the environmental standpoint, and alternative solutions have been sought.

Patent WO2003/029153 describes compositions for inhibition of inorganic deposits in the petroleum sector by means of terpolymers having a phosphate monomer, methallyl hydroxy phosphate.

It has been shown that the three monomer units in the copolymer according to the present invention work together synergistically to inhibit inorganic deposits. The inhibitor composition containing the copolymer according to the invention has properties that are improved over prior art solutions, particularly for applications where inorganic deposits are treated in HP/HT reservoirs due to the characteristics of chemical stability under conditions of high pressure/high temperature, minimum inhibitory concentration, and adsorption on a solid, and also due to its satisfactory environmental profile. In addition, the copolymer according to the invention has improved biodegradability over most of the products used in this type of application.

DESCRIPTION OF INVENTION

For purposes of simplification, the monomer or monomers from which the monomer units (i) are derived will be termed "monomer (i)" hereinbelow.

SUMMARY OF INVENTION

The invention relates to a copolymer having:
A) at least one monomer unit a) derived from at least one ethylenically unsaturated aliphatic monocarboxylic or polycarboxylic acid, a corresponding anhydride, or a corresponding water-soluble salt; and
B) at least one monomer unit b) derived from an ethylenically unsaturated sulfonated or sulfated monomer unit b) with the formula (I)

$$CH_2=C(R^1)-C(R^2)(R^3)-O-R'-Y^-X^+ \quad (I)$$

in which formula the various symbols have the following meaning:
$R^1$, $R^2$, and $R^3$, similar or different, represent
a hydrogen atom or
an alkyl radical
$R'$ represents a linear or branched divalent aliphatic radical having at least one OH substituent
$Y^-$ represents $SO_3^-$ or $SO_4^-$
X is a counterion
or at least one monomer unit b') derived from an ethylenically unsaturated sulfonated monomer unit other than (b) with the formula (II)

$$CH_2=C(R^1)-(Z)_n-R''-SO_3^-X^+ \quad (II)$$

in which formula the various symbols have the following meaning:
$R^1$ represents
a hydrogen atom or
an alkyl radical
n is equal to 0 or 1
Z represents a divalent group with the formula —C(O)—N($R^4$)—$R^5$— where
$R^4$ represents a hydrogen atom or an alkyl radical
$R^5$ represents a linear or branched aliphatic divalent radical
R" represents a linear or branched divalent aliphatic radical
X is a counterion, and
C) at least one monomer unit (c) derived from a monomer with the average general formula $$[CH_2=CH-CH_2-R^6-O-]_xP(=O)(OM)_{3-x} \quad (III)$$

wherein:
$R^6$ is a divalent organic group having carbon and hydrogen atoms and possibly heteroatoms, preferably oxygen and nitrogen, preferably a (poly)oxyalkylene group
x is a whole or decimal number between 1 and 2 inclusive or exclusive
M, identical or different, is a hydrogen atom or a cationic counterion.
Preferably, in formula (I) representing monomer (b):
$R^1$ represents
a hydrogen atom or
an alkyl radical containing 1 to 6 carbon atoms, preferably 1 to 3 carbon atoms, in particular 1 carbon atom
$R^2$, and $R^3$, similar or different, represent
a hydrogen atom or
an alkyl radical containing 1 to 6 carbon atoms, preferably 1 to 3 carbon atoms,
R' represents a linear or branched divalent aliphatic radical having at least one OH substituent and containing 1 to 6 carbon atoms, particularly 3 carbon atoms
$Y^-$ represents $SO_3^-$ or $SO_4^-$ especially preferably $SO_3^-$
X is a hydrogen, alkali metal, or ammonium counterion.

Preferably, monomer (b) is chosen from 3-(meth)allyloxy-2-hydroxy-1-propanesulfonic acids and their water-soluble salts, ammonium sulfate, and 1-(allyloxy)-2-hydroxypropyl (or "ammonium 1-(allyloxy)-2-hydroxypropyl sulfate").

Very preferably, monomer (b) is the sodium salt of 1-allyloxy-2-hydroxy-1-propanesulfonic acid (AHPS).

Advantageously, in formula (II) representing monomer (b'):
$R^1$ represents
a hydrogen atom or
an alkyl radical
n is equal to 0 or 1
Z represents a divalent group with the formula —C(O)—N($R^4$)—$R^5$— where
$R^4$ represents a hydrogen atom or an alkyl radical
$R^5$ represents a linear or branched aliphatic divalent radical
R" represents a linear or branched divalent aliphatic radical
X is a counterion.
Preferably:
$R^1$ represents
a hydrogen atom or
an alkyl radical containing 1 to 6 carbon atoms, preferably 1 to 3 carbon atoms, in particular 1 carbon atom
n is equal to 0 or 1; preferably n is equal to 1
Z represents a divalent group with the formula —C(O)—N($R^4$)—$R^5$— where
$R^4$ represents a hydrogen atom or an alkyl radical containing 1 to 4 carbon atoms
$R^5$ represents a linear or branched aliphatic divalent radical containing 1 to 8 carbon atoms, preferably a $C(CH_3)_2$— radical
R" represents a linear or branched divalent aliphatic radical, preferably containing 1 to 7 carbon atoms, in particular 1 carbon atom
X is a hydrogen, alkali metal, or ammonium counterion.
Very preferably, the monomer (b') is chosen from:
sodium vinylsulfonate (SVS)
2-methyl-2-propene-1-sulfonic acid (SMS)
2-acrylamide-2-methyl-1-propanesulfonic acid (AMPS)
and their water-soluble salts.

Advantageously, the monomer unit (a) is derived from a monomer (a) chosen from acrylic acid, methacrylic acid, maleic anhydride, or their water-soluble salts.

Very preferably, the monomer a) is chosen from acrylic acid or maleic anhydride.

Advantageously, in formula (III) representing monomer (c), $R^6$ is a (poly)oxyalkylene group with the formula —[O-A]$_n$- wherein:
A is a group with the formula —$CH_2$—$CH_2$— or —$CH_2$—CH($CH_3$)— or —CH($CH_3$)—$CH_2$— and
n is an average number at least equal to 1.

Preferably, $R^6$ is a polyoxythylene group with the formula —[O—$CH_2$—$CH_2$]$_n$— wherein n is an average number between 2 and 10.

Very preferably, the monomer unit (c) is derived from the monomer (c) polyoxyethylene alkyl ether phosphate (PAM 5000).

Advantageously, the monomer units (a) represent between 20% and 80% (as a molar percentage of the polymerized monomers), the monomer units (b) or (b') represent between 10% and 70% (as a molar percentage of the polymerized monomers), and the monomer units (c) represent between 10% and 70% (as a molar percentage of the polymerized monomers), more preferably the monomer units (a) represent between 40% and 80% (as a molar percentage of the polymerized monomers), the monomer units (b) or (b') represent between 10% and 50% (as a molar percentage of the polymerized monomers), and the monomer units (c) represent between 10% and 50% (as a molar percentage of the polymerized monomers).

The average molecular mass (expressed by weight) of the copolymer according to the invention is preferably between 1000 and 50,000 g/mol, very preferably between 2000 and 25,000 g/mol.

The invention also relates to a method of preparing a copolymer as described above, having:
- A) at least one monomer unit a)
- B) at least one monomer unit b)
- C) at least one monomer unit c)

by radical polymerization in the presence of a polymerization initiator which is a free-radical initiator of:
- a) at least one ethylenically unsaturated monocarboxylic or polycarboxylic aliphatic acid, a corresponding anhydride, or a corresponding water-soluble salt;
- b) at least one ethylenically unsaturated sulfonated or sulfated ether with the formula (I)

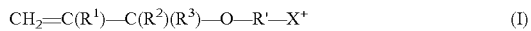
$$CH_2=C(R^1)-C(R^2)(R^3)-O-R'-X^+ \quad (I)$$

in which formula the various symbols have the following meaning:
$R^1$, $R^2$, and $R^3$, similar or different, represent
a hydrogen atom or
an alkyl radical
$R^1$ represents a linear or branched divalent aliphatic radical having at least one OH substituent
$Y^-$ represents $SO_3^-$ or $SO_4^-$
X is a counterion
or at least one monomer unit b') derived from an ethylenically unsaturated sulfonated monomer unit other than (b) with the formula (II)

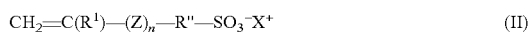
$$CH_2=C(R^1)-(Z)_n-R''-SO_3^-X^+ \quad (II)$$

in which formula the various symbols have the following meaning:
$R^1$ represents
a hydrogen atom or
an alkyl radical
n is equal to 0 or 1
Z represents a divalent group with the formula $-C(O)-N(R^4)-R^5-$ where
$R^4$ represents a hydrogen atom or an alkyl radical
$R^5$ represents a linear or branched aliphatic divalent radical
R" represents a linear or branched divalent aliphatic radical
X is a counterion, and
c) at least one monomer unit (c) with the average general formula

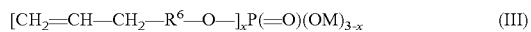
$$[CH_2=CH-CH_2-R^6-O-]_xP(=O)(OM)_{3-x} \quad (III)$$

wherein:
$R^6$ is a divalent organic group having carbon and hydrogen atoms and possibly heteroatoms, preferably oxygen and nitrogen, preferably a (poly)oxyalkylene group
x is a whole or decimal number between 1 and 2 inclusive or exclusive
M, identical or different, is a hydrogen atom or a cationic counterion.

The invention also relates to a composition that inhibits inorganic deposits having a copolymer as described above.

Preferably, in the inhibiting composition according to the invention, the amount of copolymer, on a dry weight basis, is between 1 and 70 wt. %.

Finally, the invention relates to a method for inhibiting inorganic deposits in a petroleum reservoir including the contacting of an effective amount of the inhibiting composition according to the invention with a petroleum formation.

Preferably, the petroleum reservoir is an HP/HT reservoir.

Preferably, the inorganic deposits are calcium, barium, and iron deposits.

The inhibition method may include the contacting of the inhibiting composition with the petroleum formation by the squeeze method.

FIG. 1 represents squeeze life time of MA/COPS1/PAM5000 compound in a Clashach sandstone.

DETAILED DESCRIPTION OF THE INVENTION

Description of Copolymer and Inhibiting Composition According to the Invention

The average molecular mass (expressed by weight) of the copolymer according to the invention is preferably between 1000 and 50,000 g/mol, preferably between 2000 and 25,000 g/mol, preferably between 2000 and 15,000 g/mol.

This is determined by the steric exclusion chromatography technique, the calibration curve being plotted from a set of ethylene poly(oxide) standards.

The copolymer according to the invention has the following three monomer units, described in paragraphs A, B, and C:

A) at least one monomer unit (a) derived from at least one ethylenically unsaturated monocarboxylic or polycarboxylic aliphatic acid, a corresponding anhydride, or a corresponding water-soluble salt.

The aliphatic chain of the carboxylic aliphatic acids from which the monomer unit (a) derives can be linear or branched; it preferably has 2 to 7 carbon atoms.

As an example of monomers (a), one may mention the ethylenically unsaturated α-β carboxylic acids or the corresponding anhydrides such as acrylic or methacrylic acids, maleic anhydride, fumaric acid, itaconic acid, and their water-soluble salts, particularly their alkali metal (for example sodium) or ammonium salts.

One may also mention the precursor monomers of carboxylate groups such as tertiobutyl acrylate which, after polymerization, give rise to carboxylic groups by hydrolysis.

Preferably, the monomer or monomers (a) are acrylic acid, methacrylic acid, maleic anhdyride, or their water-soluble salts, particularly sodium. In particular they may be acrylic acid or maleic anhydride.

B) at least one monomer unit (b) derived from an ethylenically unsaturated sulfonated or sulfated ether with formula (I)

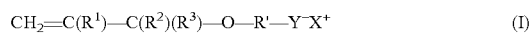
$$CH_2=C(R^1)-C(R^2)(R^3)-O-R'-Y^-X^+ \quad (I)$$

in which formula the various symbols have the following meaning:
$R^1$, $R^2$, and $R^3$, similar or different, represent
a hydrogen atom or
an alkyl radical
$R^1$ represents a linear or branched divalent aliphatic radical having at least one OH substituent
$Y^-$ represents $SO_3^-$ or $SO_4^-$
X is a counterion.

Preferably, in formula (I) representing the sulfonated or sulfated ether from which monomer unit (b) derives, the various symbols have the following meanings:

$R^1$ represents
  a hydrogen atom or
  an alkyl radical containing 1 to 6 carbon atoms, preferably 1 to 3 carbon atoms, in particular 1 carbon atom $R^2$, and $R^3$, similar or different, represent
  a hydrogen atom or
  an alkyl radical containing 1 to 6 carbon atoms, preferably 1 to 3 carbon atoms, R' represents a linear or branched divalent aliphatic radical having at least one OH substituent and containing 1 to 6 carbon atoms, particularly 3 carbon atoms $Y^-$ represents $SO_3^-$ or $SO_4^-$, especially preferably $SO_3^-$ X is a hydrogen, alkali metal, or ammonium counterion.

As examples of monomers (b), one may mention in particular 3-(meth)allyloxy-2-hydroxy-1-propanesulfonic acids and their water-soluble salts, particularly sodium, ammonium sulfate, and 1-(allyloxy)-2-hydroxypropyl (or "ammonium 1-(allyloxy)-2-hydroxypropyl sulfate").

One may cite in particular 1-allyloxy-2-hydroxyropyl sodium sulfate (AHPS) sold by Rhodia under the trade name SIPOMER COPS-1.

or at least one monomer unit (b') derived from a sulfonated ethylenically unsaturated monomer other than (b).

Preferably, the monomer units (b') derive from an ethylenically unsaturated sulfonated monomer (b') other than (b) with the formula (II)

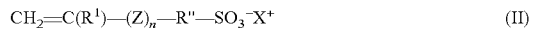

$$CH_2=C(R^1)-(Z)_n-R''-SO_3^-X^+ \qquad (II)$$

in which formula the various symbols have the following meaning:

$R^1$ represents
  a hydrogen atom or
  an alkyl radical n is equal to 0 or 1

Z represents a divalent group with the formula $-C(O)-N(R^4)-R^5-$ where
  $R^4$ represents a hydrogen atom or an alkyl radical
  $R^5$ represents a linear or branched aliphatic divalent radical R" represents a linear or branched divalent aliphatic radical X is a counterion.

More preferably, in formula (II) representing the monomer or monomers (b'), the various symbols have the following meaning:

$R^1$ represents
  a hydrogen atom or
  an alkyl radical containing 1 to 6 carbon atoms, preferably 1 to 3 carbon atoms, in particular 1 carbon atom n is equal to 0 or 1; preferably n is equal to 1

Z represents a divalent group with the formula $-C(O)-N(R^4)-R^5-$ where
  $R^4$ represents a hydrogen atom or an alkyl radical containing 1 to 4 carbon atoms
  $R^5$ represents a linear or branched aliphatic divalent radical containing 1 to 8 carbon atoms, preferably a $C(CH_3)_2-$ radical R" represents a linear or branched divalent aliphatic radical, preferably containing 1 to 7 carbon atoms, in particular 1 carbon atom X is a hydrogen, alkali metal, or ammonium counterion.

As examples of monomers (b'), one may mention in particular:
  sodium vinylsulfonate (SVS),
  2-methyl-2-propene-1-sulfonic acid (SMS)
  2-acrylamide-2-methyl-1-propanesulfonic acid (AMPS) and their water-soluble salts, particularly sodium; in particular, AMPS or its sodium salt.

C) at least one monomer unit (c) derived from a monomer with the average general formula

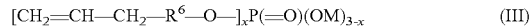

$$[CH_2=CH-CH_2-R^6-O-]_xP(=O)(OM)_{3-x} \qquad (III)$$

wherein:
  $R^6$ is a divalent organic group having carbon and hydrogen atoms and possibly heteroatoms, preferably oxygen and nitrogen, preferably a (poly)oxyalkylene group
  x is a whole or decimal number between 1 and 2 inclusive or exclusive
  M, identical or different, is a hydrogen atom or a cationic counterion.

If M is a hydrogen atom, monomer (c) is considered to be in the acid form. If M is a counterion, monomer (c) is considered to be in the saline or neutralized form. M can be for example $NH_4^+$, $Na^+$, or $K^+$. The neutralization can take place after addition of the monomer to the polymerization medium.

The monomer (c) can be a mixture of a monophosphate ester (or "monoester") with x=1, and with a diphosphate ester (or "diester") with x=2. The respective amounts of monoester and diester are such that x is greater than or equal to 1, for example greater than or equal to 1.01, and less than or equal to 2, for example less than or equal to 1.99. Preferably, monomer (c) has a large amount of monoester, where the monoester is in a high proportion relative to the diester. The number x can be for example between 1 and 1.5. Advantageously, x is between 1 and 1.2, preferably between 1.01 and 1.2. It is mentioned that x=1.2 corresponds to a monoester:diester molar ratio of 80:20.

The $R^6$ group is a divalent organic group having carbon and hydrogen atoms and, optionally, heteroatoms such as oxygen and/or nitrogen atoms. Preferred examples of $R^6$ groups include divalent alkylene groups with 2 to 20 carbon atoms and (poly)oxyalkylene groups.

Preferably, the $R^6$ group is a (poly)oxyalkylene group with the formula $-[O-A-]_n-$, wherein:
  A, identical or different, is a group with the formula 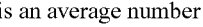$-CH_2-CH_2-$ or $-CH_2-CH(CH_3)-$, or $CH(CH_3)-CH_2-$ and
  n is an average number at least equal to 1.

The $-O-A-$ groups wherein A is $-CH_2-CH_2-$ correspond to the ethoxy groups which can be obtained from ethylene oxide. The $-O-A-$ groups in which A is either $-CH_2-CH(CH_3)-$ or $-CH(CH_3)-CH_2-$ correspond to the propoxy groups which can be obtained from propylene oxide. The (poly)oxyalkylene groups with the formula $-[O-A-]_n-$ can comprise both ethoxy and propoxy groups arranged randomly or in blocks.

Preferably, $R^6$ is a polyoxyethylene group with the formula $-[O-CH_2-CH_2]_n-$, wherein n is an average number between 2 and 10, preferably between 2.5 and 7.

Preferably, the monomer from which the monomer unit (c) is derived is polyoxyethylene alkyl ether phosphate, sold by Rhodia under the name PAM 5000.

According to a preferred embodiment of the invention, the copolymer is a terpolymer of acrylic acid, 1-allyloxy-2-hydroxypropyl sodium sulfonate (AHPS) sold by Rhodia under the trade name SIPOMER COPS-1, and PAM 5000.

According to a second preferred embodiment of the invention, the copolymer is a terpolymer of maleic acid, -2-acrylamide-2-methyl-1-propanesulfonic acid (AMPS) or its sodium salt, and PAM 5000.

According to a third preferred embodiment of the invention, the copolymer is a terpolymer of maleic acid, 1-allyloxy-2-hydroxypropyl sodium sulfonate (AHPS) sold by Rhodia under the trade name SIPOMER COPS-1, and PAM 5000.

Preferably, in the copolymer according to the invention, the monomer units (a) represent between 20% and 80% (as a molar percentage of polymerized monomers), the monomer units (b) or (b') represent between 10% and 70% (as a molar percentage of polymerized monomers), and the monomer units (c) represent between 10% and 70% (as a molar percentage of polymerized monomers).

More preferably, the monomer units (a) represent between 40% and 80% (as a molar percentage of polymerized monomers), the monomer units (b) or (b') represent between 10% and 50% (as a molar percentage of polymerized monomers), and the monomer units (c) represent between 10% and 50% (as a molar percentage of polymerized monomers).

The average molecular mass (expressed by weight) of the copolymer according to the invention is preferably between 1000 and 50,000 g/mol, preferably between 2000 and 25,000 g/mol, or still more preferably between 2000 and 15,000 g/mol.

Method of Preparation
Preparation of Monomers A, B, and C

The monomers A, B, and C can for example be prepared according to the preparation methods described in the PCT Patent WO 2008/135403 published on Nov. 13, 2008.

General Synthesis Method

The copolymers according to the invention can be obtained by known copolymer preparation techniques, particularly by radical polymerization of the ethylenically unsaturated starting monomers. One possible polymerization method is described below.

Polymerization can be initiated by adding a polymerization initiator. The initiators used are the free-radical initiators commonly used in the art. The preferred initiators are water-soluble.

The low-reactivity monomers, for example maleic acid or 1-allyloxy-2-hydroxypropyl sodium sulfonate are introduced as the starter with water into a suitable reactor The starter is heated with agitation to a set temperature. Next, an initiator, for example sodium persulfate and, in certain cases and if necessary, a transfer agent such as mercaptoacetic acid, are added discontinuously or continuously at a controlled rate for a set period of time.

When the monomer have high reactivity, for example acrylic acid or 2-acrylamide-2-methyl-1-propanesulfonic acid, they are introduced in similar fashion to introduction of the initiator and transfer agent, i.e., once the starter has heated. The addition is made for a set period of time, discontinuously or continuously, at a controlled rate.

Once the reaction is complete, the heat is turned off and the reaction mixture is allowed to cool before it is unloaded.

The copolymers are obtained in solution form and the solution can be partially or totally evaporated, generally at low pressure.

The partially or totally evaporated copolymers will be re-diluted before use.

The dissolved copolymers can be used as such as inhibitors as defined by the invention, or purified by traditional methods.

The copolymers according to the invention, in which some or all of the acid hydrogens are replaced by cations derived from an appropriate salt forming a base can also be prepared by mixing an aqueous, water-alcohol, or alcohol solution containing an appropriate quantity of the required base with the desired degree of substitution.

Hence, the mention also relates to a method of preparing a copolymer as described above, having:
A) at least one monomer unit a)
B) at least one monomer unit b)
C) at least one monomer unit c)
as described above, by radical polymerization in the presence of a polymerization initiator which is a free-radical initiator of:
a) at least one ethylenically unsaturated monocarboxylic or polycarboxylic aliphatic acid, a corresponding anhydride, or a corresponding water-soluble salt;
b) at least one ethylenically unsaturated sulfonated or sulfated ether with the formula (I)

$$CH_2=C(R^1)-C(R^2)(R^3)-O-R'-Y^-X^+ \quad (I)$$

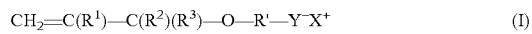

in which formula the various symbols have the following meaning:
$R^1$, $R^2$, and $R^3$, similar or different, represent
  a hydrogen atom or
  an alkyl radical
$R^1$ represents a linear or branched divalent aliphatic radical having at least one OH substituent
$Y^-$ represents $SO_3^-$ or $SO_4^-$
$X$ is a counterion
or at least one ethylenically unsaturated sulfonated monomer unit (b') other than (b) with the formula (II)

$$CH_2=C(R^1)-(Z)_n-R''-SO_3^-X^+ \quad (II)$$

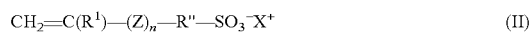

in which formula the various symbols have the following meaning:
$R^1$ represents
  a hydrogen atom or
  an alkyl radical
n is equal to 0 or 1
Z represents a divalent group with the formula —C(O)—N($R^4$)—$R^5$— where
  $R^4$ represents a hydrogen atom or an alkyl radical
  $R^5$ represents a linear or branched aliphatic divalent radical
R" represents a linear or branched divalent aliphatic radical
X is a counterion, and
C) at least one monomer unit (c) with the average general formula $$[CH_2=CH-CH_2-R^6-O-]_xP(=O)(OM)_{3-x} \quad (III)$$

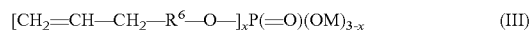

wherein:
$R^6$ is a divalent organic group having carbon and hydrogen atoms and possibly heteroatoms, preferably oxygen and nitrogen, preferably a (poly)oxyalkylene group
x is a whole or decimal number between 1 and 2 inclusive or exclusive
M, identical or different, is a hydrogen atom or a cationic counterion.

Method for Inhibiting Inorganic Deposits

During transportation and storage operations, the inhibitors according to the invention are either in the powder form or in solution at a concentration of about 10 to 50 wt. %.

When used in petroleum wells, the solutions intended for continuous injection into the wells have a concentration of about 1 to 100 ppm, while the squeezed solutions are generally injected at a concentration of about 10 wt. %, all these concentration values being provided as an indication only.

Non-limitatively, the composition according to the invention applies advantageously to inorganic deposits in the petroleum sector, particularly in geological petroleum reservoirs, especially under HP/HT conditions.

The inhibiting composition according to the invention is preferably applied to a reservoir rock by a squeeze method, namely a method enabling a large quantity of product to be injected into the reservoir from a well so that the inhibitor is gradually released around the well into the reservoir rock. Squeezing is a three-step process in which the fluids are injected directly into the well with the liquid flowing in the opposite direction to the production flow. First, a dilute solution of inhibitor (generally between 0.1 and 1%) is injected together with a surfactant to flush and cool the well surroundings. This step is followed by injection of a concentrated inhibitor solution ("pill") at a percentage generally between 1 and 70%, followed by another injection of a weakly concentrated inhibitor solution ("pill") to push the concentrated solution away from the well surroundings for a distance calculated by laboratory modeling to yield the best length of squeeze treatment. The solutions are left in contact with the reservoir for 6 to 24 hours, ideally to allow adsorption equilibrium to be attained. The well is then put back into production.

The adsorption properties on the rock of the copolymer according to the invention allow it to remain close to the well without being entrained with the water/oil emulsion when production starts up again, and to remain at concentrations above the MIC in the aqueous phase for a prolonged period.

Other embodiments of the inhibitor composition including the copolymer according to the invention can be used to treat downhole inorganic deposits: gas lift injection during production, downhole annular injection, encapsulation, or techniques employing solid matrices, or wellhead undersea injections.

EXAMPLES

Examples 1-5

Copolymer Synthesis

Meaning of Abbreviations or Initialisms Used in the Synthesis Examples:

| | |
|---|---|
| AA | Acrylic Acid |
| MA | Maleic Acid |
| SVS | Sodium VinylSulfonate |
| COPS1 | 1-allyloxy-2-hydroxypropyl sodium sulfonate |
| AMPS | 2-acrylamido-2-methylpropane Sodium Sulfonate |
| PAM5000 | Polyoxyethylene Alkyl ether phosphate |

After polymerization, the final solution is analyzed by steric exclusion chromatography using ethylene poly(oxide). The average molar masses are expressed by weight.

Example 1

Synthesis of a Copolymer Based on MA/COPS1/PAM5000

The following are introduced at room temperature into a 500 ml three-necked flask fitted with a mechanical agitator:
  25.57 g of a 40 wt. % aqueous maleic acid solution
  18.65 g of a 40 wt. % aqueous solution of Sipomer COPS1 (Rhodia monomer),
  18.63 g of a 30 wt. % aqueous solution of Sipomer PAM5000 (Rhodia monomer), and 106.36 g of purified water.

The reaction mixture is brought to 80° C. with agitation. The following are then added together in one dose: 12.35 g of a 10 wt. % solution of sodium persulfate and 2.03 g of a 3 wt. % aqueous solution of mercaptoacetic acid. After 60 minutes reaction, 2.03 g of a 3 wt. % aqueous solution of mercaptoacetic acid is added in a single dose. After 120 minutes, 12.35 g of a 10 wt. % sodium persulfate solution and 2.03 g of a 3 wt. % aqueous mercaptoacetic acid solution are added together in one dose. The mixture is then held at 80° C. under agitation for a further 240 minutes. After 360 minutes, the heat is turned off and the reaction mixture is allowed to cool to room temperature before the solution is unloaded.

The average molecular mass measured by weight on the solution is 4306 g/mol. The theoretical dry extract is 13 wt. %.

Example 2

Synthesis of a Copolymer Based on MA/AMPS/PAM5000

The following are introduced into a 500 ml three-necked flask at room temperature:
  25.57 g of a 40 wt. % maleic acid solution
  18.63 g of a 30 wt. % aqueous solution of Sipomer PAM5000 (Rhodia monomer) and 106.36 g of purified water.

The reaction mixture is brought to 80° C. with agitation. The following are then added together in one dose: 12.35 g of a 10 wt. % solution of sodium persulfate and 2.03 g of a 3 wt. % aqueous solution of mercaptoacetic acid. After 10 minutes, 2.83 g of a 50 wt. % aqueous solution of AMPS is added in a single dose. After 40 minutes, 2.83 g of a 50 wt. % aqueous solution of AMPS is again added in a single dose. After 60 min, 2.03 g of a 3 wt. % aqueous solution of mercaptoacetic acid is added in a single dose. After 80 minutes, once again 2.83 g of a 50 wt. % aqueous solution of AMPS is added in a single dose. After 120 minutes, 12.35 g of a 10 wt. % solution of sodium persulfate and 2.03 g of a 3 wt. % aqueous solution of mercaptoacetic acid are added together in a single dose. After 140 minutes, 2.83 g of a 50 wt. % aqueous solution of AMPS is again added in a single dose. After 160 min, for the last time 2.83 g of AMPS solution is added then the mixture is held at 80° C. under agitation for a further 200 minutes. After 360 minutes, the heat is turned off and the reaction mixture is allowed to cool to room temperature before the solution is unloaded.

The average molecular mass measured by weight on the solution is 5470 g/mol. The theoretical dry extract is 13 wt. %.

Example 3

Synthesis of a Copolymer Based on AA/COPS1/PAM5000

The following are introduced into a 500 ml three-necked flask at room temperature:
  61.32 g of a 40 wt. % aqueous solution of Sipomer COPS1 (Rhodia monomer B)
  21.81 g of a 92 wt. % aqueous solution of Sipomer PAM5000 (Rhodia monomer C) and 45.68 g of purified water.

The reaction mixture is brought to 80° C. with agitation. The following are then added together in one dose: 25.75 g of a 10 wt. % solution of sodium persulfate and 3.86 g of a 3 wt. % aqueous solution of mercaptoacetic acid. After 10 minutes, 1.62 g of acrylic acid is added in a single dose. After 40 minutes, 1.62 g of acrylic acid is added once again in a single dose. After 60 minutes, 3.86 g of a 3 wt. % aqueous solution of mercaptoacetic acid is added in a single dose. After 80 minutes, 1.62 g of acrylic acid is again added in a single dose. After 120 minutes, 25.75 g of a 10 wt. % solution of sodium persulfate and 3.86 g of a 3 wt % aqueous solution of mercaptoacetic acid are added simultaneously in a single dose. After 140 minutes, 1.62 g of acrylic acid is again added in a single dose. After 160 minutes, 1.62 g of acrylic acid is added for the last time then the mixture is held at 80° C. under agitation for a further 200 minutes. After 360 minutes, the heat is turned off and the reaction mixture is allowed to cool to room temperature before the solution is unloaded.

The average molecular mass measured by weight on the solution is 12982 g/mol. The theoretical dry extract is 29 wt. %.

Example 4

Synthesis of a Copolymer Based on MA/SVS/PAM5000

Into a 250 ml three-necked round bottom flask fitted with a condenser is added:

41.1 g of Maleic Acid (100%), 70.82 g of a 25 wt. % active aqueous solution of SVS (sodium vinysulfonate), 23.75 g of a 92 wt. % aqueous solution of Sipomer PAM5000 (Rhodia monomer C).

The reaction mixture is heated to 80° C. with agitation. To the reaction medium is then added in one shot, 3.96 g of a 25% wt. solution of Sodium Persulphate. Immediately afterwards, 15.85 g of a 25% wt. solution of Sodium Persulphate is added continuously over five hours. Following completion of the addition of the Sodium Persulphate solution, the reaction mixture is held at 80° C. under agitation for a further 2 hours. After 420 minutes the reactor is allowed to cool to room temperature before being discharged.

The average molecular mass measured by weight on the solution is 7550 g/mol. The theoretical dry extract is 55 wt. %.

Example 5

Synthesis of a Copolymer Based on AA/SVS/PAM5000

Into a 250 ml three-necked round bottom flask fitted with a condenser is added:

52 g of a 25 wt. % active aqueous solution of sodium vinysulfonate (SVS), 17.43 g of a 92 wt. % aqueous solution of Sipomer PAM5000 (Rhodia monomer C).

The reaction mixture is heated to 80° C. with agitation. To the reaction medium is then added in one shot, 5.89 g of a 25% solution of Sodium Persulphate. Immediately afterwards, Acrylic acid 18.74 g is added continuously over 3 hours. Simultaneously, 23.56 g of a 25 wt % solution of Sodium Persulphate is added continuously over 200 minutes. Following completion of the addition of the sodium persulphate solution, the reaction mixture is held at 80° C. under agitation for a further 100 minutes. After 350 minutes the reactor is allowed to cool to room temperature before being discharged.

The average molecular mass measured by weight on the solution is 43125 g/mol. The theoretical dry extract is 45 wt. %.

Examples 6-10

Examples of Evaluation of the Efficacy of Inhibiting $CaCO_3$ and $BaSO_4$ Under Static and Dynamic Conditions These examples are a performance comparison with a phosphoric amino acid (DETPMP), a classical scale inhibitor. Inhibitors with a high phosphorus content such as DETPMP are generally effective scale inhibitors but often omitted due to their unsatisfactory environmental profiles and their low heat stability, unlike the products according to the invention as will appear from a perusal of the comparative tables below.

Two types of assessments were conducted:

A static condition evaluate called the jar test or bottle test, consisting of measuring the level of soluble precipitating cation (calcium or barium) after mixing it in a bottle of two incompatible liquids, then [observing] the change in the mixture without agitation for a given time, and measuring the soluble cations by a spectroscopic method (ICP-AES). The experiments include a control test without inhibitor and tests in the presence of inhibitors.

A dynamic condition evaluation called the tube blocking test, which consists of measuring, at 150° C. at 15 bars, the time taken for a capillary to clog up when a mixture of two incompatible liquids is injected: for a study on carbonate deposits (calcite, etc.), one liquid contains bicarbonate ions and the other, calcium ions; for a study on sulfate deposits, one liquid contains sulfate ions and the other, barium ions. Each of the liquids contains a quantity of inhibitor that decreases gradually by 20 ppm to a lower threshold concentration for which the clogging time is less than or equal to 1 hour. This threshold concentration is called minimum inhibitory concentration (MIC).

By measuring the differential pressure between the inlet and outlet of the capillary, clogging of the capillary can be tracked over a range of 0-5 bars. The stainless steel capillary is 1 meter long with an inside diameter of 0.5 mm.

Example 6

Evaluation of Inhibition Performance of $CaCO_3$ Under Static Conditions

This evaluation is carried out at 95° C. and neutral pH after mixing two brines, one of which contains calcium and the other, sodium bicarbonate. The inhibitor is placed in the water containing bicarbonate. The inhibitor concentration is 10 ppm (of active ingredient) relative to the final mixture.

The brine compositions are the following:

| Concentration (g/l) | Cation Liquid | Anion Liquid |
|---|---|---|
| NaCl | 33.00 | 33.00 |
| $MgCl_2, 6H_2O$ | 3.68 | 0 |
| $CaCl_2, 2H_2O$ | 12.15 | 0 |
| $NaHCO_3$ | 0 | 7.36 |

50 ml of each of these two liquids is placed in polyethylene bottles. Once the temperature of the brines has settled to 95° C. in an oven, the contents of the "anion" bottle are poured into the bottle containing the calcium. The mixture is shaken manually then replaced in the oven at 95° C. for 2 hours. Two tests are run:

Min blank: this is a test without inhibitor and the calcium ion content will be minimal (maximum precipitation of $CaCO_3$);

Max blank: this is a test without bicarbonate and without inhibitor; the anionic brine is replaced by purified water and the calcium ion content will be maximal as there is no precipitation.

After two hours of testing, the bottles are removed from the oven and a 1 ml sample is taken then diluted in 20 ml of purified water. The calcium from these samples is assayed and the inhibition effectiveness is deduced, expressed in the formula below:

$$\% \text{ efficiency} = \frac{[Ca^{2+}] - [Ca^{2+}]_{min}}{[Ca^{2+}]_{max} - [Ca^{2+}]_{min}} * 100$$

The table below shows the performance levels obtained:

| Inhibitor | % $CaCO_3$ inhibition effectiveness (10 ppm) |
| --- | --- |
| Example 1 MA/COPS1/PAM5000 | 45 |
| Example 2 MA/AMPS.PAM5000 | 42 |
| Example 3 AA/COPS1/PAM5000 | 26 |
| Example 4 MA/SVS/PAM5000 | 41 |
| Example 5 AA/SVS/PAM5000 | 25 |
| DETPMP | 39 |

Example 7

Evaluation of Inhibition Performance of $BaSO_4$ Under Static Conditions

This evaluation is carried out at 95° C. and pH 5.5 after mixing two brines, one of which has the composition of the formation water of the Forties Field in the North Sea (contains barium) and the other has the seawater composition containing sulfate. The inhibitor is placed in the seawater. The inhibitor concentration is 15 ppm (of active ingredient) relative to the final mixture.

The pH of the seawater solution containing inhibitor is brought to about 5.5 with a sodium acetate/acetic acid buffer solution.

The brine compositions (Forties water and seawater) are the following:

| Ion | mg/L | Salt | Salt (g/L) |
| --- | --- | --- | --- |
| Forties Water | | | |
| $Na^+$ | 31275 | NaCl | 79.50 |
| $Ca^+$ | 2000 | $CaCl_2, 2H_2O$ | 7.34 |
| $Mg^{2+}$ | 739 | $MgCl_2, 6H_2O$ | 6.18 |
| $K^+$ | 654 | KCl | 1.25 |
| $Ba^{2+}$ | 269 | $BaCl_2, 2H_2O$ | 0.48 |
| $Sr^{2+}$ | 87.6 | $SrCl_2, 6H_2O$ | 2.35 |
| Seawater | | | |
| $Na^+$ | 10890 | NaCl | 24.40 |
| $Ca^+$ | 428 | $CaCl_2, 2H_2O$ | 1.57 |
| $Mg^{2+}$ | 1368 | $MgCl_2, 6H_2O$ | 11.44 |
| $K^+$ | 460 | KCl | 0.88 |
| $SO_4^{2-}$ | 2690 | $Na_2SO_4$ | 3.97 |

100 ml of each of these liquids is placed in polyethylene bottles. Once the temperature of the brines has settled to 95° C. in an oven, the contents of the "Forties water" bottle are poured into the bottle containing the barium. The mixture is shaken manually then replaced in the oven at 95° C. for 2 hours. For each test series, two control tests are run:

Min blank: this is a test without inhibitor and the barium ion content will be minimal (maximum precipitation of $BaSO_4$);

Max blank: this is a test without sulfate and without inhibitor; the seawater is replaced by purified water and the barium ion content will be maximal as there is no precipitation.

After two hours of testing, the bottles are removed from the oven and a 5 ml sample is taken then diluted in 5 ml of a "soaking" solution whose composition is: 5000 ppm KCl/ 1000 ppm PVA (polyvinyl sodium sulfonate) adjusted to pH 8-8.5 (with 0.01N NaOH). The barium from these samples is assayed (ICP-AES) and the inhibition effectiveness deduced, expressed in the formula below:

$$\% \text{ efficiency} = \frac{[Ba^{2+}] - [Ba^{2+}]_{min}}{[Ba^{2+}]_{max} - [Ba^{2+}]_{min}} * 100$$

where $[Ba^{2+}]_{max}$ = $Ba^{2+}$ concentration in max blank $[Ba^{2+}]_{min}$ = $Ba^{2+}$ concentration in min blank The table below shows the performance levels obtained:

| Inhibitor | % $BaSO_4$ inhibition effectiveness (15 ppm) |
| --- | --- |
| Example 1 MA/COPS1/PAM5000 | 67 |
| Example 2 MA/AMPS.PAM5000 | 85 |
| Example 3 AA/COPS1/PAM5000 | 20 |
| Example 4 MA/SVS/PAM5000 | 71 |
| Example 5 AA/SVS/PAM5000 | 47 |
| DETPMP | 95 |

Example 8

Evaluation of Inhibition Performance of $CaCO_3$ Under Dynamic Conditions

This evaluation is conducted at 150° C. at a pressure of 15 bars after mixing the two brines, one containing the anions including bicarbonate and the other the cations including calcium. The composition of the mixture of the two brines represents the calcium carbonate precipitation conditions in the Kristin Field, North Sea. The inhibitor is placed in the anion liquid. The pH is 7-7.5.

The starting inhibitor concentration is 20 ppm (active ingredient) relative to the mixture, then this level is gradually reduced until the capillary clogs.

The clogging time taken arbitrarily to determine the MIC is 1 hour.

The brine flow rate is 2×25 ml/h.

| Salt Composition mg/l | Cation Liquid | Anion Liquid |
| --- | --- | --- |
| NaCl | 86000 | 86000 |
| KCl | 8013 | 0 |
| $MgCl_2, 6H_2O$ | 1857 | 0 |
| $ClCl_2, 2H_2O$ | 18707 | 0 |
| $SrCl_2, 6H_2O$ | 3249 | 0 |
| $BaCl_2, 2H_2O$ | 5755 | 0 |
| $NaHCO_3$ | 0 | 844 |

The table below shows the MIC values obtained:

| Inhibitor | MIC (CaCO$_3$), ppm |
|---|---|
| Example 1 MA/COPS1/PAM5000 | 2 < MIC < 5 |
| Example 2 MA/AMPS.PAM5000 | 5 < MIC < 10 |
| Example 3 AA/COPS1/PAM5000 | 10 < MIC < 20 |
| DETPMP | MIC < 2 |

Example 9

Evaluation of Inhibition Performance of BaSO$_4$ Under Dynamic Conditions

This evaluation was conducted at 150° C. at a pressure of 15 bars and a pH of 6 after mixing two brines, one containing anions including sulfate and the other, cations including barium. The composition of the two-brine mixture corresponds to a 50:50 mixture of North Sea Forties Field liquid and a seawater. The inhibitor is placed in the anion liquid. The pH of the anion liquid is adjusted to 6 by adding an acetic acid/sodium acetate buffer.

To start with, the inhibitor concentration is 20 ppm (active ingredient) relative to the mixture, after which this level is gradually reduced until the capillary clogs.

The clogging time taken arbitrarily for measuring the MIC is 1 hour. The brine flowrate is 2×5 ml/h.

| Salt Composition mg/l | Cation Liquid | Anion Liquid |
|---|---|---|
| NaCl | 0 | 98,708 |
| BaCl$_2$, 2H$_2$O | 445 | 0 |
| SrCl$_2$, 6H$_2$O | 2033 | 0 |
| CaCl$_2$, 2H$_2$O | 12,978 | 0 |
| MgCl$_2$, 6H$_2$O | 15,461 | 0 |
| KCl | 440 | 440 |
| Na$_2$SO$_4$ | 0 | 4379 |

The table below shows the MIC values obtained:

| Inhibitor | MIC (BaSO$_4$), ppm |
|---|---|
| Example 1 MA/COPS1/PAM5000 | 2 < MIC < 5 |
| Example 2 MA/AMPS.PAM5000 | MIC < 2 |
| Example 3 AA/COPS1/PAM5000 | 2 < MIC < 5 |
| DETPMP | 2 < MIC < 5 |

Example 10

Squeeze Life Time of Example 1 MA/COPS1/PAM5000

Core is made of Chashach sandstone. The inhibitor (MA/COPS1/PAM5000) is dissolved in Sea Water at the concentration of 10 g/l. The test temperature is 120° C.

The Clashach sandstone is saturated with Sea Water then 3 pore volume (PV) of inhibitor solution is injected followed by an overnight shut in time. Sea water is then injected for inhibitor elution. The inhibitor concentration is analyzed by organic carbon and the squeeze life time is measured.

As shown in FIG. 1, the inhibitor concentration in the returns is high over a large volume of injected water. The squeeze life time estimated at the MIC is of 800 PV. This makes the MA/COPS1/PAM 5000 suitable for squeeze in high temperature wells.

Examples 11-12

Examples of Evaluation of Adsorption Properties Under Static Conditions

The additives according to the invention are evaluated for their ability to adsorb on the rock and on clay.

For this purpose, a solution of known concentration of inhibitor in synthetic seawater is brought into contact, under agitation, for 4 hours, at 85° C., with a known quantity of solid. The solid suspension is then centrifuged and filtered, then analyzed in terms of dissolved organic carbon. The adsorbed amount is measured using the following protocol:

For each solution of additive diluted in seawater at the concentration in question, the organic carbon concentration (COT$_{SM}$- in ppm) and a response coefficient K (additive concentration in solution/organic carbon concentration in solution) are determined.

The organic carbon concentration (COT$_{filtrate}$ in ppm) in the supernatant solution after adsorption is determined.

The adsorbed quantity (QA) is then calculated using the following formula:

$$QA = \frac{(COT_{SM} - COT_{Filtrate}) \times K \times V_{SM}}{1000 \times M_{Solid} \times S_{BET}}$$

where:
$V_{SM}$=volume of solution in cm$^3$
$M_{Solid}$=mass of solid in grams
$S_{BET}$=specific surface of solid Example 10

Adsorption on Sandstone

The sandstone used is ground Clashach sandstone. Its specific surface measured by the BET method with nitrogen is about 1 m$^2$/g. For each product, solutions of 1 mg/l active ingredient are prepared in seawater. The pH of these solutions is adjusted to 2, 4, and 6 using hydrochloric acid or sodium hydroxide.

For each test, 10 ml of solution and 10 g of sandstone are used, i.e. a solid:liquid ratio of 1.

The table below shows the adsorptions measured.

| Inhibitor | pH | Quantity Adsorbed (mg additive/m$^2$ sandstone) |
|---|---|---|
| Example 1 MA/COPS1/PAM5000 | 2 | 0.54 |
|  | 4 | 0.36 |
|  | 6 | 0.25 |
| Example 2 MA/AMPS.PAM5000 | 2 | 0.50 |
|  | 4 | 0.40 |
|  | 6 | 0.32 |
| Example 3 AA/COPS1/PAM5000 | 2 | 0.77 |
|  | 4 | 0.42 |
|  | 6 | 0.38 |

Example 11

Adsorption on Clay

The clay used is ground kaolinite. Its specific surface measured by the BET method with nitrogen is 12 m$^2$/g. For each product, solutions of 3.5 mg/l active ingredient are prepared in seawater. The pH of these solutions is adjusted to 6 using hydrochloric acid or sodium hydroxide.

For each test, 13 ml of solution and 2.6 g of kaolinite are used, i.e. a solid:liquid ratio of 0.2.

The table below shows the adsorptions measured.

| Inhibitor | Quantity Adsorbed (mg additive/m² clay) |
|---|---|
| Example 1 MA/COPS1/PAM5000 | 0.31 |
| Example 2 MA/AMPS.PAM5000 | 0.38 |
| Example 3 AA/COPS1/PAM5000 | 0.56 |

The invention claimed is:

1. Copolymer comprising:
A) at least one monomer unit a) derived from at least one ethylenically unsaturated aliphatic monocarboxylic or polycarboxylic acid, a corresponding anhydride, or a corresponding water-soluble salt;
B) at least one monomer unit b) derived from an ethylenically unsaturated sulfonated or sulfated monomer unit b) with the formula (I)

$$CH_2=C(R^1)-C(R^2)(R^3)-O-R'-Y^-X^+ \quad (I)$$

in which formula the various symbols have the following meaning:
$R^1$, $R^2$, and $R^3$, similar or different, represent
a hydrogen atom or
an alkyl radical
R' represents a linear or branched divalent aliphatic radical comprising at least one OH substituent
$Y^-$ represents $SO_3^-$ or $SO_4^-$
X is a counterion or at least one monomer unit b') derived from an ethylenically unsaturated sulfonated monomer unit other than (b) with the formula (II)

$$CH_2=C(R^1)-(Z)_n-R''-SO_3^-X^+ \quad (II)$$

in which formula the various symbols have the following meaning:
$R^1$ represents
a hydrogen atom or
an alkyl radical
n is equal to 0 or 1
Z represents a divalent group with the formula $-C(O)-N(R^4)-R^5-$ where
$R^4$ represents a hydrogen atom or an alkyl radical
$R^5$ represents a linear or branched aliphatic divalent radical
R" represents a linear or branched divalent aliphatic radical
X is a counterion; and
C) at least one monomer unit (c), wherein the at least one monomer unit (c) comprises a diphosphate ester derived from polyoxyethylene alkyl ether phosphate, wherein the polyoxyethylene alkyl ether phosphate has the general formula $$[CH_2=CH-CH_2-R^6-O-]_xP(=O)(OM)_{3-x} \quad (III)$$

Wherein:
$R^6$ is a polyoxyethylene group
x is a number between 1 and 2 inclusive or exclusive
M is a hydrogen atom or a cation counterion.

2. Copolymer according to claim 1 wherein, in formula (I) representing monomer (b):
$R^1$ represents
a hydrogen atom or
an alkyl radical containing 1 to 6 carbon atoms
$R^2$, and $R^3$, similar or different, represent
a hydrogen atom or
an alkyl radical containing 1 to 6 carbon atoms
R' represents a linear or branched divalent aliphatic radical comprising at least one OH substituent and containing 1 to 6 carbon atoms
$Y^-$ represents $SO_3^-$ or $SO_4^-$
X is a hydrogen, alkali metal, or ammonium counterion.

3. Copolymer according to claim 2 wherein monomer (b) is chosen from 3-(meth)allyloxy-2-hydroxy-1-propanesulfonic acids and their water-soluble salts, ammonium sulfate, and 1-(allyloxy)-2-hydroxypropyl or ammonium 1-(allyloxy)-2-hydroxypropyl sulfate.

4. Copolymer according to claim 3 wherein monomer (b) is the sodium salt of 1-allyloxy-2-hydroxy-1-propanesulfonic acid (AHPS).

5. Copolymer according to claim 1 wherein, in formula (II) representing monomer (b'):
$R^1$ represents
a hydrogen atom or
an alkyl radical
n is equal to 0 or 1
Z represents a divalent group with the formula $-C(O)-N(R^4)-R^5-$ where
$R^4$ represents a hydrogen atom or an alkyl radical
$R^5$ represents a linear or branched aliphatic divalent radical
R" represents a linear or branched divalent aliphatic radical
X is a counterion.

6. Copolymer according to claim 5 wherein, in formula (II) representing monomer (b'):
$R^1$ represents
a hydrogen atom or
an alkyl radical containing 1 to 6 carbon atoms
n is equal to 0 or 1
Z represents a divalent group with the formula $-C(O)-N(R^4)-R^5-$ where
$R^4$ represents a hydrogen atom or an alkyl radical containing 1 to 4 carbon atoms
$R^5$ represents a linear or branched aliphatic divalent radical containing 1 to 8 carbon atoms
R" represents a linear or branched divalent aliphatic radical
X is a hydrogen, alkali metal, or ammonium counterion.

7. Copolymer according to claim 6 wherein the monomer (b') is chosen from:
sodium vinylsulfonate (SVS)
2-methyl-2-propene-1-sulfonic acid (SMS)
2-acrylamide-2-methyl-1-propanesulfonic acid (AMPS)
and their water-soluble salts.

8. Copolymer according to claim 6 wherein, in formula (II) representing monomer (b'):
$R^1$ represents
a hydrogen atom or
an alkyl radical containing 1 to 3 carbon atoms
n is equal to 1
Z represents a divalent group with the formula $-C(O)-N(R^4)-R^5-$ where
$R^4$ represents a hydrogen atom or an alkyl radical containing 1 to 4 carbon atoms
$R^5$ represents a linear or branched aliphatic divalent radical containing a $C(CH_3)_2-$ radical R" represents a linear or branched divalent aliphatic radical containing 1 to 7 carbon atoms X is a hydrogen, alkali metal, or ammonium counterion.

9. Copolymer according to claim 2 wherein, in formula (I) representing monomer (b):
   $R^1$ represents
   a hydrogen atom or
   an alkyl radical containing 1 to 3 carbon atoms,
   $R^2$, and $R^3$, similar or different, represent
   a hydrogen atom or
   an alkyl radical containing 1 to 3 carbon atoms,
   R' represents a linear or branched divalent aliphatic radical comprising at least one OH substituent and containing 3 carbon atoms
   $Y^-$ represents $SO_3^-$ or $SO_4^-$
   X is a hydrogen, alkali metal, or ammonium counterion.

10. Copolymer according to claim 9 wherein, in formula (I) representing monomer (b):
    $R^1$ represents
    a hydrogen atom or
    an alkyl radical containing 1 carbon atom
    $R^2$, and $R^3$, similar or different, represent
    a hydrogen atom or
    an alkyl radical containing 1 to 3 carbon atoms,
    R' represents a linear or branched divalent aliphatic radical comprising at least one OH substituent and containing 3 carbon atoms
    $Y^-$ represents $SO_3^-$
    X is a hydrogen, alkali metal, or ammonium counterion.

11. Copolymer according to claim 1 wherein the monomer (a) is chosen from acrylic acid, methacrylic acid, maleic anhydride, or their water-soluble salts.

12. Copolymer according to claim 11 where the monomer a) is chosen from acrylic acid or maleic anhydride.

13. Copolymer according to claim 1 wherein the at least one monomer unit (a) represents between 20% and 80% (as a molar percentage of the polymerized monomers), the at least one monomer unit (b) or (b') represents between 10% and 70% (as a molar percentage of the polymerized monomers), and the at least one monomer unit (c) represents between 10% and 70% (as a molar percentage of the polymerized monomers).

14. Copolymer according to claim 1 wherein the average molecular mass (expressed by weight) of the copolymer according to the invention is preferably between 1000 and 50,000 g/mol.

15. Copolymer according to claim 1 wherein, the monomer unit (c) further comprises a monophosphate ester derived from polyoxyethylene alkyl ether phosphate.

16. Method for preparing a copolymer according to claim 1 comprising:
    A) at least one monomer unit a) B) at least one monomer unit b) C) at least one monomer unit c) by radical polymerization in the presence of a polymerization initiator which is a free-radical initiator of:
    A) at least one ethylenically unsaturated monocarboxylic or polycarboxylic aliphatic acid, a corresponding anhydride, or a corresponding water-soluble salt;
    B) at least one ethylenically unsaturated sulfonated or sulfated ether with the formula (I)

$$CH_2=C(R^1)-C(R^2)(R^3)-O-R'-Y^-X^+ \quad (I)$$

in which formula the various symbols have the following meaning:
    $R^1$, $R^2$, and $R^3$, similar or different, represent
    a hydrogen atom or
    an alkyl radical
    R' represents a linear or branched divalent aliphatic radical comprising at least one OH substituent
    $Y^-$ represents $SO_3^-$ or $SO_4^-$
    X is a counterion
    or at least one monomer unit b') derived from an ethylenically unsaturated sulfonated monomer unit other than (b) with the formula (II)

$$CH_2=C(R^1)-(Z)_n-R''-SO_3^-X^+ \quad (II)$$

in which formula the various symbols have the following meaning:
    $R^1$ represents
    a hydrogen atom or
    an alkyl radical
    n is equal to 0 or 1
    Z represents a divalent group with the formula $-C(O)-N(R^4)-R^5-$ where
    $R^4$ represents a hydrogen atom or an alkyl radical
    $R^5$ represents a linear or branched aliphatic divalent radical
    R" represents a linear or branched divalent aliphatic radical
    X is a counterion, and
    c) at least one monomer unit (c), wherein the at least one monomer unit (c) is comprises a diphosphate ester derived from polyoxyethylene alkyl ether phosphate, wherein the polyoxyethylene alkyl ether phosphate has the general formula $$[CH_2=CH-CH_2-R^6-O-]_xP(=O)(OM)_{3-x} \quad (III)$$

Wherein:
    $R^6$ is a polyoxyethylene group
    x is a number between 1 and 2 inclusive or exclusive
    M is a hydrogen atom or a cation counterion.

17. Method for preparing a copolymer according to claim 16 wherein, the monomer unit (c) further comprises a monophosphate ester derived from polyoxyethylene alkyl ether phosphate.

18. Composition that inhibits inorganic deposits comprising a copolymer according to claim 1.

19. Composition that inhibits inorganic deposits according to claim 18 wherein the amount of copolymer, on a dry weight basis, is between 1 and 70 wt. %.

20. Method for inhibiting inorganic deposits in a petroleum reservoir including the contacting of an effective amount of the inhibiting composition according to claim 18 with a petroleum formation.

21. Method for inhibiting inorganic deposits according to claim 20 wherein the petroleum reservoir is a HP/HT reservoir.

22. Method for inhibiting inorganic deposits according to claim 20 wherein the inorganic deposits are calcium, barium, and iron deposits.

23. Method for inhibiting inorganic deposits according to claim 20 including the contacting of the inhibiting composition with the petroleum formation by the squeeze method.

* * * * *